United States Patent
Cohen et al.

(10) Patent No.: US 7,733,812 B2
(45) Date of Patent: *Jun. 8, 2010

(54) METHOD FOR ENABLING MULTIPOINT NETWORK SERVICES OVER A RING TOPOLOGY NETWORK

(75) Inventors: Yoav Cohen, Kfar Saba (IL); Gilad Goren, Nirit (IL)

(73) Assignee: Alcatel, Paris (FR)

( * ) Notice: Subject to any disclaimer, the term of this patent is extended or adjusted under 35 U.S.C. 154(b) by 1735 days.

This patent is subject to a terminal disclaimer.

(21) Appl. No.: 10/861,527

(22) Filed: Jun. 7, 2004

(65) Prior Publication Data

US 2005/0271035 A1    Dec. 8, 2005

(51) Int. Cl.
    *H04L 12/16* (2006.01)
(52) U.S. Cl. ...................................................... 370/260
(58) Field of Classification Search ............... 218/218, 218/219, 351, 406, 404, 360, 260, 261, 352, 218/254, 255, 431, 539; 709/226, 227, 288, 709/231, 237, 238, 252; 329/202, 229; 348/14; 375/220; 370/260, 258, 419, 395, 399, 229, 370/231, 221–222, 351, 352; 455/556
See application file for complete search history.

(56) References Cited

U.S. PATENT DOCUMENTS

| | | | |
|---|---|---|---|
| 5,973,724 A * | 10/1999 | Riddle | 348/14.07 |
| 6,532,088 B1 | 3/2003 | Dantu et al. | |
| 6,680,922 B1 | 1/2004 | Jorgensen | |
| 6,937,566 B1 * | 8/2005 | Forslow | 370/231 |
| 7,283,465 B2 * | 10/2007 | Zelig et al. | 370/219 |
| 2002/0009092 A1 * | 1/2002 | Seaman et al. | 370/406 |
| 2002/0176450 A1 * | 11/2002 | Kong et al. | 370/539 |
| 2003/0017845 A1 * | 1/2003 | Doviak et al. | 455/556 |
| 2003/0142674 A1 | 7/2003 | Casey | |
| 2004/0165600 A1 * | 8/2004 | Lee | 370/395.53 |
| 2004/0233891 A1 * | 11/2004 | Regan et al. | 370/351 |
| 2005/0271036 A1 * | 12/2005 | Cohen et al. | 370/351 |
| 2006/0007854 A1 * | 1/2006 | Yu | 370/229 |
| 2006/0143300 A1 * | 6/2006 | See et al. | 709/227 |
| 2007/0206492 A1 * | 9/2007 | Zelig et al. | 370/218 |
| 2008/0056278 A1 * | 3/2008 | Kadambi et al. | 370/395.53 |

* cited by examiner

*Primary Examiner*—Pankaj Kumar
*Assistant Examiner*—Prenell P Jones
(74) *Attorney, Agent, or Firm*—Carmen Patti Law Group, LLC

(57) ABSTRACT

A method, device, and system for providing multipoint network services over a ring topology network. According to the disclosed method point-to-point connections and point-to-multipoint connections are established between network elements (NEs) providing the same network services. These connections eliminate the need for replicating packets at a source NE and, as a result, the bandwidth utilization is significantly improved. In one embodiment of this invention the multipoint network services provided by the present invention is a virtual private LAN service (VPLS).

27 Claims, 11 Drawing Sheets

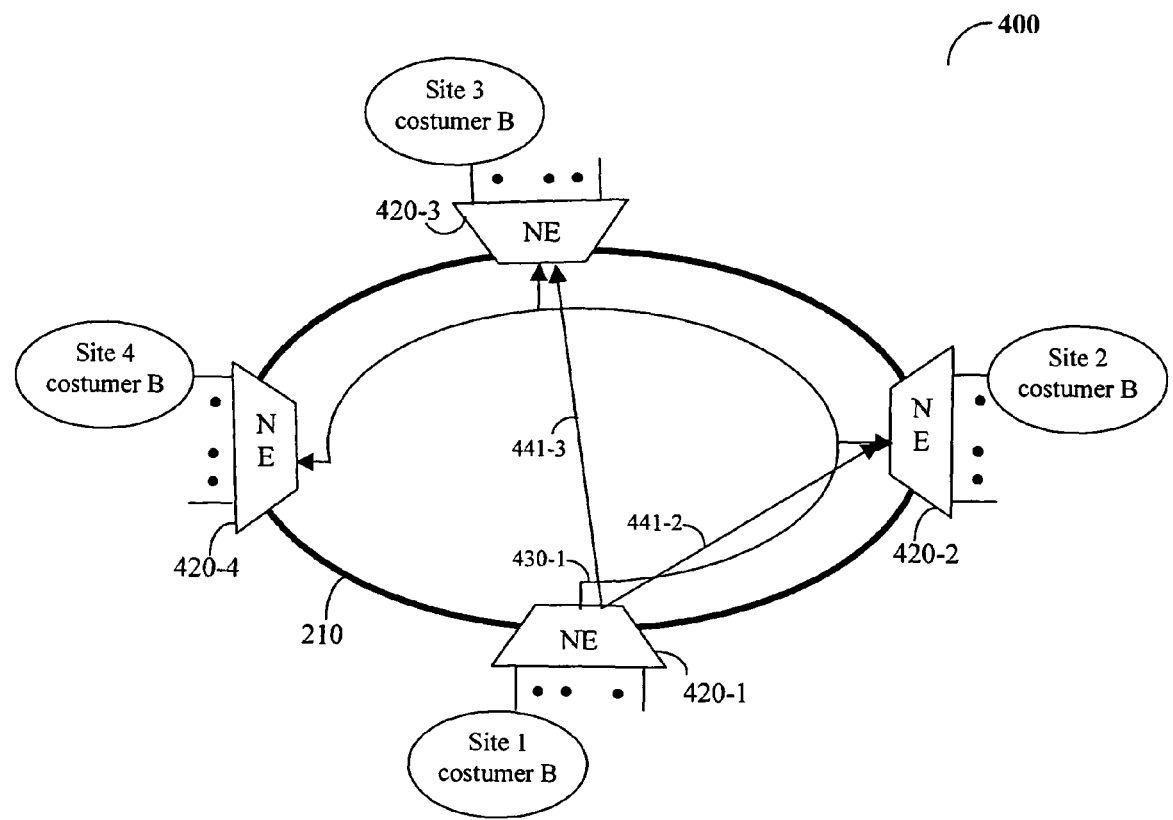
FIRGURE 4C

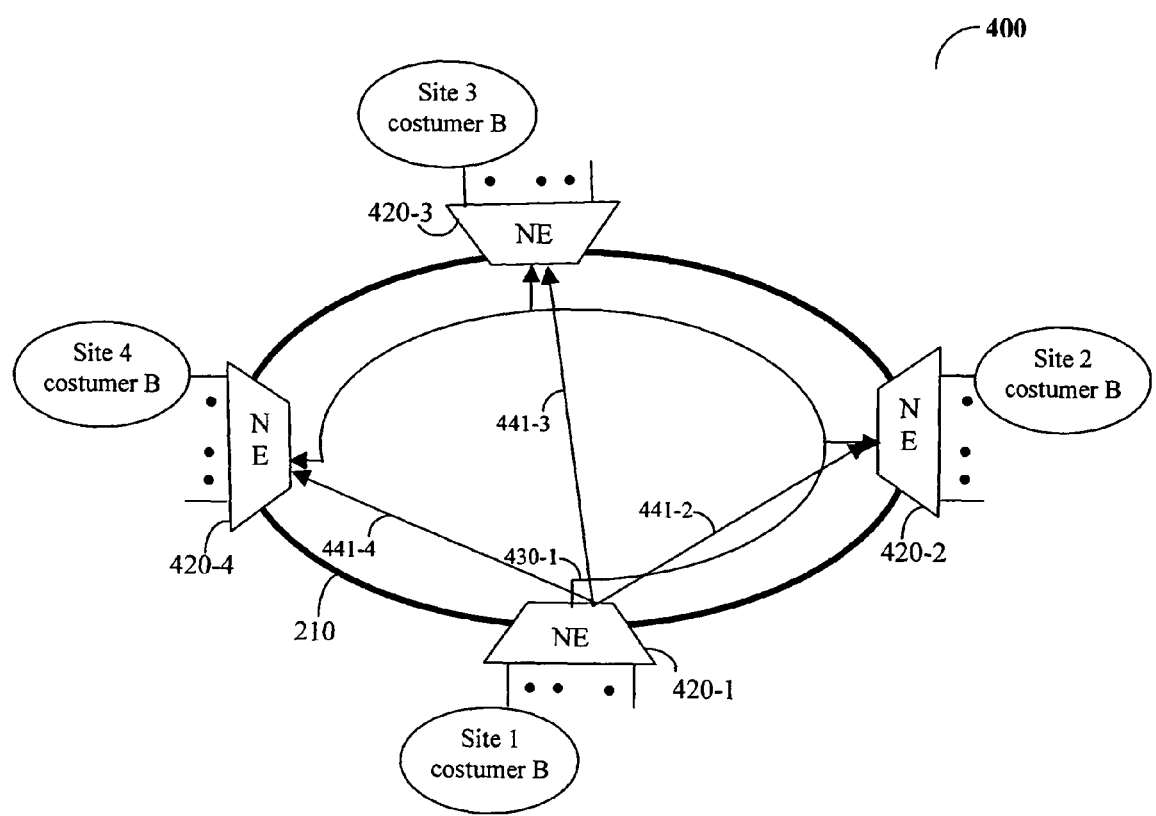
FIRGURE 4D

| Forward Information Table (FIT) ||
|---|---|
| Label | Function |
| 991 | drop-and-forward |
| 12 | drop |
| 13 | forward |
| 14 | forward |

FIGURE 5

| DNE2DL ||
|---|---|
| Network Element | Destination label |
| 420-2 | 12 |
| 420-3 | 13 |
| 420-4 | 14 |
| | |

FIGURE 7A

| DA2DL Table ||
|---|---|
| Destination address | Destination label |
| xyz | 12 |
| yyy | 13 |
| zzz | 14 |
| | 991 |
| | |

FIGURE 7B

METHOD FOR ENABLING MULTIPOINT NETWORK SERVICES OVER A RING TOPOLOGY NETWORK

FIELD OF THE INVENTION

The present invention relates generally to virtual private networks, and in particular to a method for enabling the operation of virtual private local area network (LAN) services.

BACKGROUND OF THE INVENTION

Ethernet has emerged as the standard of choice for local area networks. With speeds of 10 Mbps, 100 Mbps, 1 Gbps, and 10 Gbps, Ethernet capacity has grown to meet the need for increased network capacities. Consequently, there is considerable interest by operators to offer multipoint network services over public networks. A multipoint network service is a service that allows each of the customer sites to communicate directly and independently with all other customer sites connected to the network via a common interface.

A new network technology that renders multipoint connectivity services has been introduced recently in U.S. patent application Ser. No. 10/265,621 by Casey. This technology is known as "virtual private LAN service" (VPLS). VPLS is a multipoint Layer 2 virtual private network (VPN) technology that allows multiple sites to be connected over a emulated Ethernet broadcast domain that is supported across, for example, multi-protocol label switching (MPLS) networks. That is, VPLS provides connectivity between geographically dispersed customer sites across metropolitan area networks (MANs) or wide area networks (WANs), seemingly as if the customer sites were connected using a LAN.

Abstractly, a VPLS can be defined as a group of virtual switch instances (VSIs) that are interconnected in a full-mesh topology to form an emulated LAN. Specifically, a full-mesh of transport tunnels (i.e pseudowires) needs to be established between network elements (NEs) participating in a single VPLS. Concretely, a VSI can be seen as a bridging function, in which a packet is switched based upon its destination address "DA" (e.g., a medium access layer (MAC) address) and membership in a VPLS. If the destination address is unknown, or is a broadcast or multicast address, the packet is flooded (i.e., replicated and broadcasted) to all transport tunnels associated with the VSI. All NEs participating in a single VPLS instance appear to be on the same LAN.

Reference is now made to FIG. 1, which shows a VPLS 100 established between sites 110, 112, 114 and 116 of a customer A. Sites 110, 112, 114 and 116 are served by NEs 120, 122, 124 and 126 respectively. Each site is connected to an output port of each NE through a customer edge (CE) device (not shown). The VPLS is formed by a full-mesh of pseudowire (PW) connections 130 that interconnect NEs 120 through 126. The PW connections are carried over a MPLS network 150.

NEs in VPLS 100 need to support a "split-horizon" scheme in order to prevent loops. Namely, a NE in VPLS 100 is not allowed to forward traffic from one PW to another PW in the same VPLS. Furthermore, each NE in VPLS 100 needs to implement basic bridging capabilities, such as flooding packets and replicating packets, as well as learning and aging (to remove unused) destination addresses. A packet received at a source NE (e.g. NE 120) is transmitted to its destination based on the DA designated in the packet. If the source NE (in this case 120) does not recognize the destination NE associated with the DA, the packet is flooded to all other NEs in VPLS 100.

A packet to be flooded is replicated in as many copies as the number of PWs 130 connected to a NE, namely, a packet is replicated on all connections that are associated with a particular VSI. The number of packet replications increases linearly as the number of connections in the VSI increases. This replication is not as efficient as the mechanism for transmitting broadcast traffic with Ethernet switching technology, in which broadcast traffic is transmitted only once per physical interface. Furthermore, replicating packets and transmitting them at wire speed may not be feasible.

VPLS and other multipoint network services are designed to operate properly only in a full-mesh logical topology. This significantly limits the bandwidth utilization when providing VPLS over networks that have a network topology other than a full-mesh topology, such as ring topology networks. Therefore, it would be advantageous to allow multipoint network services to be efficiently executed over networks having a topology other than a full-mesh topology. It would be further advantageous to eliminate the shortcomings resulting from the need to replicate packets.

SUMMARY OF THE INVENTION

The present invention discloses a method and system for providing multipoint network services over a network that has a topology other than a full-mesh topology, specifically a ring network topology.

According to the present invention there is provided a method for enabling efficient bandwidth utilization of multipoint network services over a ring topology network that includes a plurality of network elements (NEs), comprising the steps of: setting up a full connectivity between the NEs of connected through the ring topology network, and providing multipoint network services between the NEs using the full connectivity; whereby data packets of the multipoint network services are flooded from one of the NEs that serves as a source NE to all other NEs of the plurality that serve as edge NEs, and whereby the data packets are replicated at the source NE.

According to the present invention there is provided A network element (NE) operative to enable efficient bandwidth utilization of a multipoint network service over a ring topology network, comprising a virtual connection selector (VCS) operative of mapping incoming data packets to connections, and a plurality of inputs/outputs used for transferring the data packets to and from the connections, whereby the NE communicates with other NEs sharing the multipoint network service over a full connectivity established between the NEs of the ring topology network; and whereby data packets of the multipoint network service flooded from the NE to all the other NEs are not be replicated at the source NE.

According to the present invention there is provided a system for efficient bandwidth utilization of a multipoint network service over a ring topology network, the system comprising a plurality of network elements (NEs), each NE operative to provide a forwarding function, and a full connectivity mechanism that facilitates multipoint network services between all the NE on the ring topology network.

BRIEF DESCRIPTION OF THE DRAWINGS

The invention is herein described, by way of example only, with reference to the accompanying drawings, wherein:

FIG. 5 is an example for the content of a forward information table (FIT);

FIG. 7A is an example for the content of a 'destination NE to a destination label' (DNE2DL) mapping table;

FIG. 7B is an example for the content of a 'destination label mapping table (DA2DL) table;

DETAILED DESCRIPTION OF THE PREFERRED EMBODIMENTS

The present invention discloses a method and system for providing multipoint network services over a ring network topology. In a preferred embodiment, the multipoint network services are provided as a VPLS. According to the disclosed method, point-to-point (P2P) connections and point-to-multipoint (2MP) connections are established between network elements that provide the same network service. These connections enable the efficient execution of multipoint network services. The present invention eliminates the need for replicating packets at the source NE and, as a result, the bandwidth utilization is significantly improved.

Figure 1:
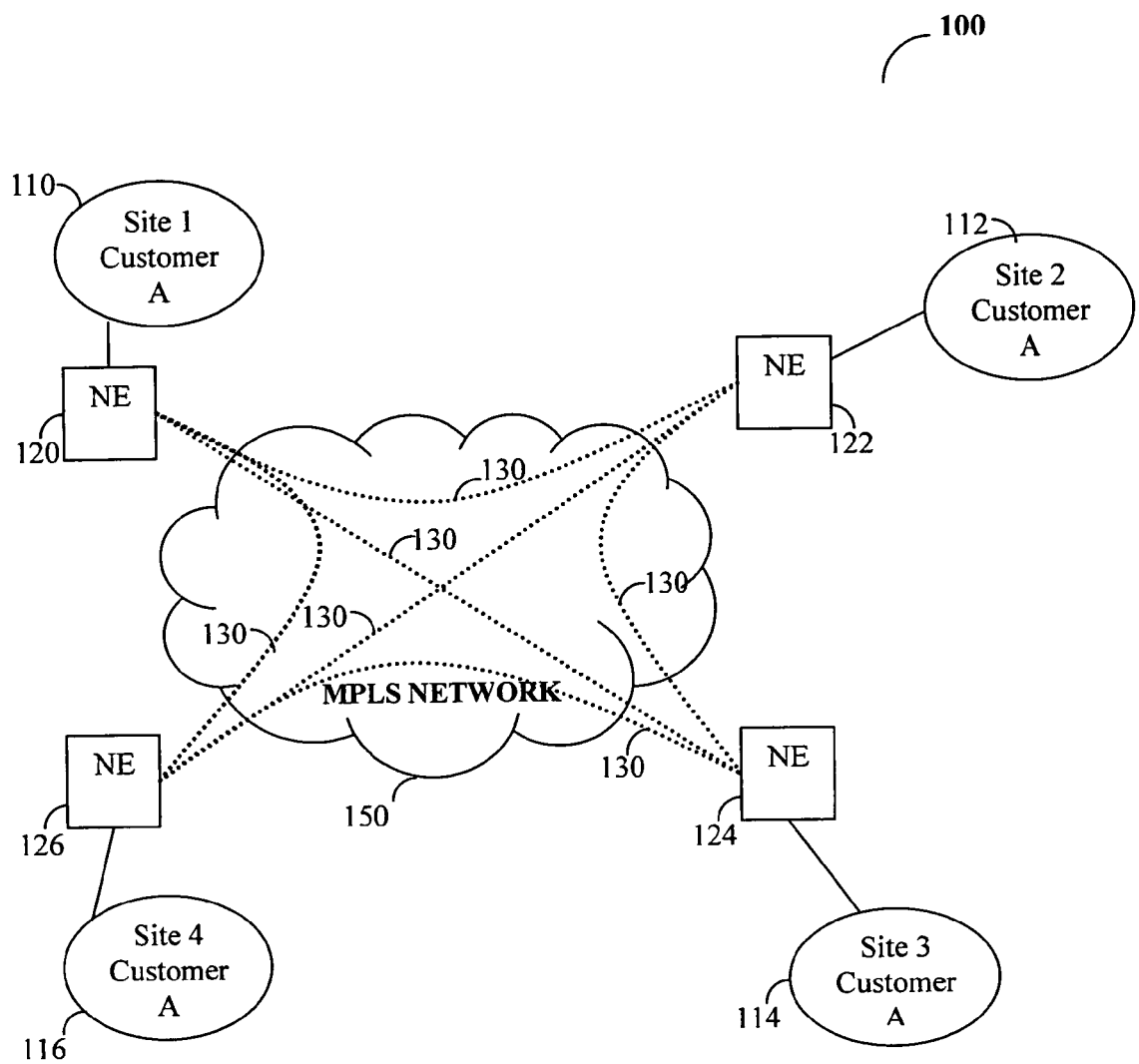
FIG. 1 is an exemplary VPLS network (prior-art)
Figure 2:
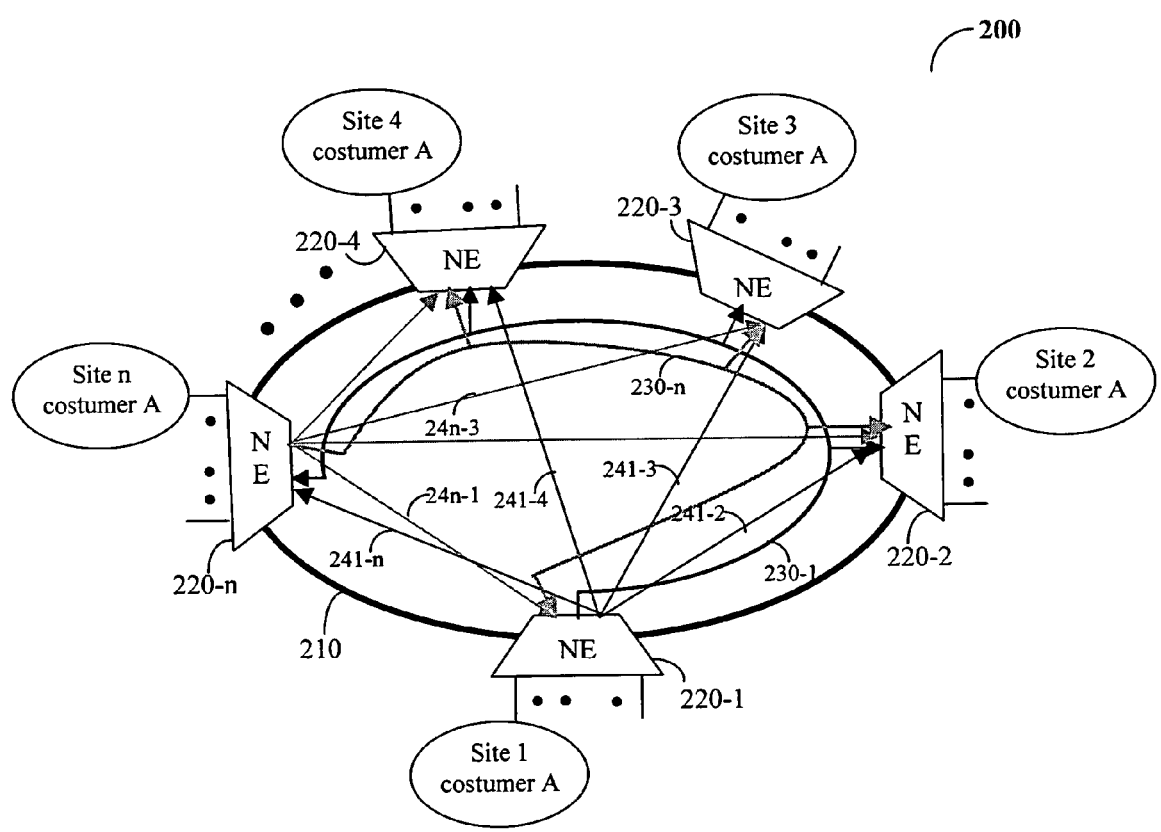
FIG. 2 is an illustration of a fiber optic ring network used to demonstrate the principles of the present invention.

Reference is now made to FIG. 2, which shows an illustration of a fiber optic ring network 200 used to highlight the principles of the present invention. Network 200 may be, but is not limited to, a synchronous optical network (SONET), a synchronous digital hierarchy (SDH) network, a resilient packet ring (RPR) network, a Frame Relay network and the like.

Network 200 comprises a plurality of "n" NEs 220 connected to a fiber optic ring 210. NEs 220-1 through 220-n establish a single VPLS between the sites of a customer A. Each site is connected to an output port of each NE 220 through a customer edge (CE) device (not shown). Each NE 220 is capable of forwarding labeled packets to other NEs. To allow the operation of a VPLS, full connectivity needs to be established between the NEs. The present invention sets up a full connectivity between NEs 220-1 through 220-n by creating point-to-point connections and point-to-multipoint connections between each and every one of the NEs 220 participating in the VPLS. FIG. 2 shows only connections originating from NE 220-1 and NE 220-n. For example, a point-to-multipoint connection 230-1 connects between a NE 220-1 and NEs 220-2 through 220-n. Also, 'n−1' point-to-point connections 241-2 through 241-n connect between NE 220-1 and NEs 220-2 through 220-n, respectively. Connections 24n-1 through 24n-3 are point-to-point connections originating from NE 220-n. Thus, at most 'n' connections can be created from each NE 220, i.e. 'n−1' point-to-point connections and a single point-to-multipoint connection. Hence, the number of connections required to be established between NEs 220 participating in a VPLS are at most 'n*(n−1)' unidirectional point-to-point connections and 'n' point-to-multipoint connections. A point-to-point connection (e.g., connection 241-3) is not a direct connection, i.e., the connection is established through fiber optic ring 210 and passed transparently through all NEs 220 lying in the path between the source NE (e.g. 210) and the edge NE (e.g., NE 220-3 for connection 241-3). The creation of the point-to-point and the point-to multipoint connections is described in greater detailed below. Note that while only a single VPLS is shown in FIG. 2, network 200 may comprise a plurality of VPLSs. Network 200 may also include NEs that are not part of a VPLS. It should be noted the full connectivity can be established through a partial mesh of point-to-point connections and point-to-multipoint connections.

To allow for the functionality of the point-to-point and the point-to-multipoint connections, each NE 220 is configured to perform at least the following functions: drop, forward, and drop-and-forward (additional functions may include address learning and aging). The drop function drops packets at the specific NE with the aim of sending them out of fiber optic ring 210, i.e., transfers packets to one or more CE devices connected to a respective NE 220. The forward function forwards packets from the NE (e.g., NE 220-2) to its neighbor NE (e.g., NE 220-3), where both NEs 220-2 and 220-3 may be part of the same VPLS. Note that if a NE does not participate in a specific VPLS service, it is configured to forward all traffic belonging to that specific VPLS. The drop-and-forward function replicates an incoming packet internally in a local NE, drops a copy of the replicated packet in the local NE, and forwards the packet to the next NE. Each NE 220 is configured with the appropriate functions for each connection (i.e. it is configured as to how to handle packet received on this connection, i.e., drop, forward, or drop-and-forward). In addition, as mentioned, each NE 220 is capable of learning destination addresses as described in greater detail below with reference to FIG. 5.

Figure 3:
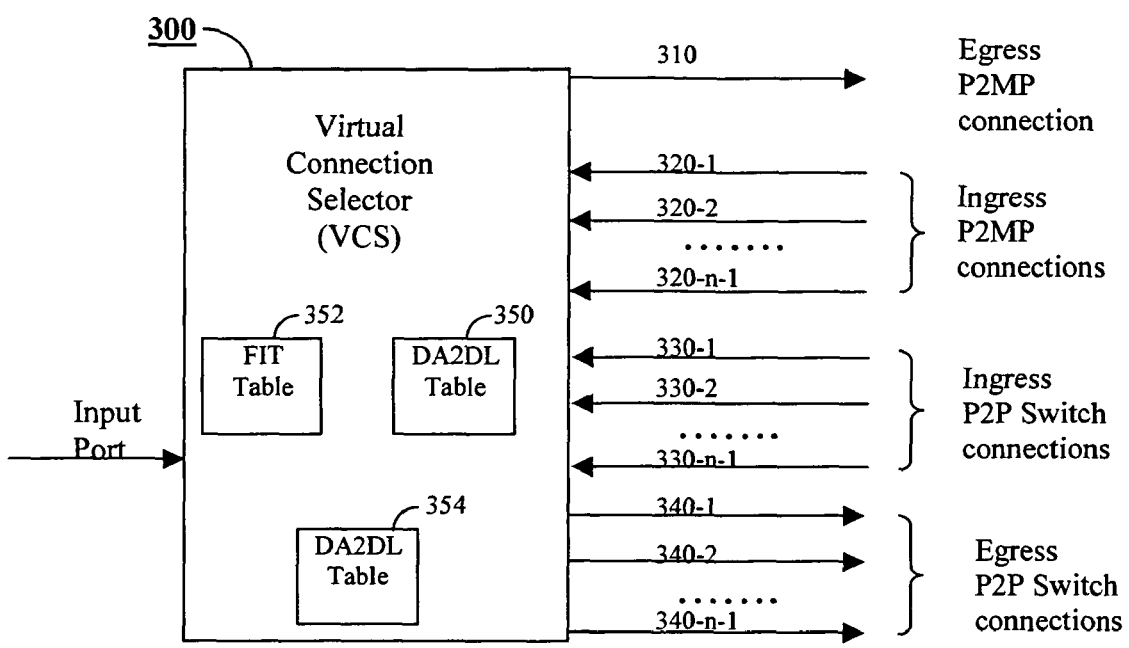
FIG. 3 is an exemplary diagram of a virtual connection selector (VCS)

The VPLS is realized through an inventive virtual connection selector (VCS) included in each NE. Specifically, the VCS executes all activities related to forwarding packets and mapping incoming packets to connections. A schematic diagram of a VCS 300 is shown in FIG. 3. VCS 300 includes virtual interfaces 310, 320, 330 and 340. Interface 310 is an egress for a point-to-multipoint connection used for flooded packets, interfaces 320-1 through 320-n−1 are ingresses of 'n−1' incoming point-to-multipoint connections, interfaces 330-1 through 330-n−1 are ingresses of 'n−1' incoming point-to-point connections, and interfaces 340-1 through 330-n−1 are egresses of 'n−1' outgoing point-to-point connections. Note that if a partial mesh is established, then the number of ingress and egress connections may be less than 'n−1' on each interface.

VCS 300 further includes a destination address-to-a-destination label ("DA2DL") mapping table 350, a destination NE-to-a-destination label ("DNE2DL") mapping table 345, and a forwarding information table ("FIT") 352. VCS 300 of a source NE assigns a label (e.g., a MPLS label) for each incoming packet received on a specific input port. Specifically, a packet is mapped to a connection according to its destination address. The mapping information is preferably kept in the DA2DL 350 table, but may also be kept elsewhere. Packets are forwarded along an established connection where each VCS 300 along the path of the connection makes forwarding decisions based solely on the content of the label. The forwarding information is preferably kept in FIT 352, which indicates per each label how to handle the packet, i.e., drop, forward, or drop-and-forward. DNE2DL table 354 maintains the mapping information of destination NEs to point-to-point connections. The contents of DA2DL table 350, FIT 352, and DNE2DL table 354 may be preconfigured or dynamically updated. Specifically, DA2DL table 350 can be dynamically configured through a learning procedure described in greater detail below.

Reference is now made to FIG. 4, which shows an exemplary VPLS, established according to the present invention. FIG. 4 shows a fiber optic ring network 400 that includes four NEs 420-1, 420-2, 420-3 and 420-4 connected to a connection medium 410. The VPLS is established, between the sites of a customer B, by creating a single point-to-multipoint connection and three point-to-point connections for each NE 420, for a total of sixteen connections. For simplicity, only connections originating in NE 420-1 are shown.

Figure 4A:
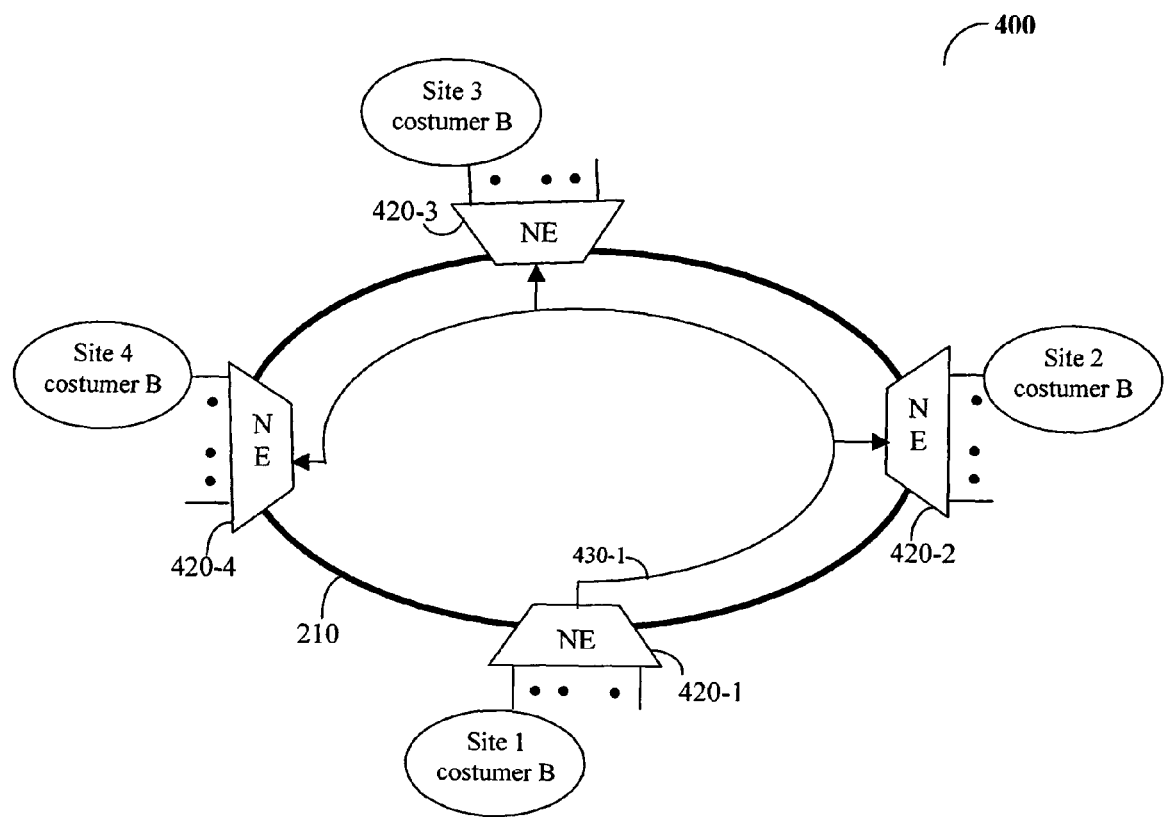
FIG. 4 is an example for building a VPLS in accordance with the present invention.

As shown in FIG. 4A, a point-to-multipoint connection 430-1 is established between NE 420-1 and NEs 420-2 through 420-4 by configuring each of NEs 420-2, 420-3 and 420-4. Specifically, for the creation of connection 430-1, NE 420-2 and NE 420-3 are configured to operate in a drop-and-forward mode, while NE 420-4 is configured to operate in a drop mode. Furthermore, a label designated as a default label is associated with point-to-multipoint connection 430-1. For example, the default label associated with connection 430-1 is '991'. Subsequently, other three point-to-multipoint connections from NEs 420-2, 420-3 and 420-4 are created.

Figure 4B:
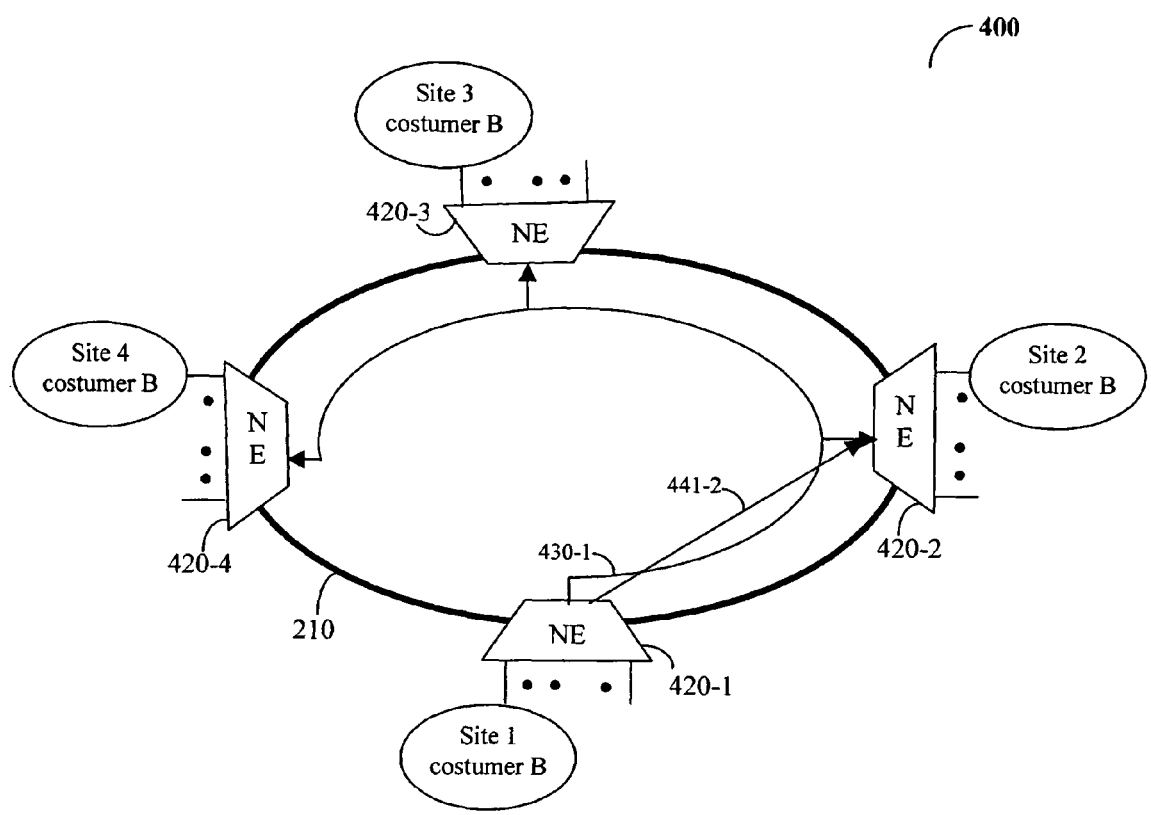

Next, the point-to-point connections are established, where a single connection is added at a time. As shown in FIG. 4B, a point-to-point connection 441-2 is set up between NE 420-1 and NE 420-2. This is achieved by configuring NE 420-2 to operate in a drop mode and by notifying NE 420-2 with a label associated with connection 441-2. The configuration may be done in software, in hardware or in a combination of software and hardware. The label associated with connection 441-2 is '12'. As shown in FIG. 4C, a point-to-point connection 441-3 is setup between NE 420-1 and NE 420-3, by configuring NE 420-2 to operate in a forward mode and NE 420-3 to operate in a drop mode (assuming appropriate ring directionality). NE 420-3 is also notified with a label associated with connection 441-3. The label associated with connection 441-3 is '13'. The process of building the VPLS continues by adding another point-to-point connection 441-4 between NE 420-1 and NE 420-4. This is done through configuring NE 420-2 and NE 420-3 to operate in a forward mode, and NE 420-4 to operate in a drop mode. Further, NE 420-4 is notified with a label associated with connection 441-4. The label associated with connection 441-4 is '14'. All connections originating from NE 420-1 are shown in FIG. 4D. The process for creating point-to-point connections is thereafter repeated at most for three more times, for each of NEs 420-2, 420-3 and 420-4. The relations between operation modes, i.e., 'drop', 'forward' or 'drop-and-forward' and connections are saved in FIT 352.

As an example, FIG. 5 shows the content of a FIT 352 in NE 420-2 after configuring the connections associated with NE 420-1. The content of the FIT 352 is based on the point-to-point connections 441-1 through 441-4 and point-to-multipoint connection 430. The operation to be taken is designated for each label. For example, the operation is set to drop-and-forward for label '991' of point-to-multipoint connection 430. The creation of point-to-point and point-to-multipoint connections can be executed manually by means of, e.g., a network management system (NMS) or automatically by means of a signaling protocol.

It should be noted by one skilled in the art that the implementation of the VPLS discussed hereinabove is merely one embodiment of the disclosed invention. For example, another approach is to create the point-to-point connections first and then add the point-to-multipoint connections. However, packet replication at the source node must be performed in the case where point-to-multipoint connections are not created. Yet, another approach is to create the point-to-multipoint connections first, and then create point-to-point connections dynamically following the real traffic patterns.

In accordance with this invention, the point-to-point connections are associated with destination addresses (DAs), e.g., medium access layer (MAC) addresses. The association between a point-to-point connections and a destination address may be performed either manually by e.g. using a NMS or by using a learning procedure. In the former case, a point-to-point connection is associated with (i.e. has a logical connection with) a DA using a NMS. A source NE (e.g., NE 420-1) determines the destination address of an incoming packet and sends the packet over a point-to-point connection associated with the designated destination address.

Figure 6:
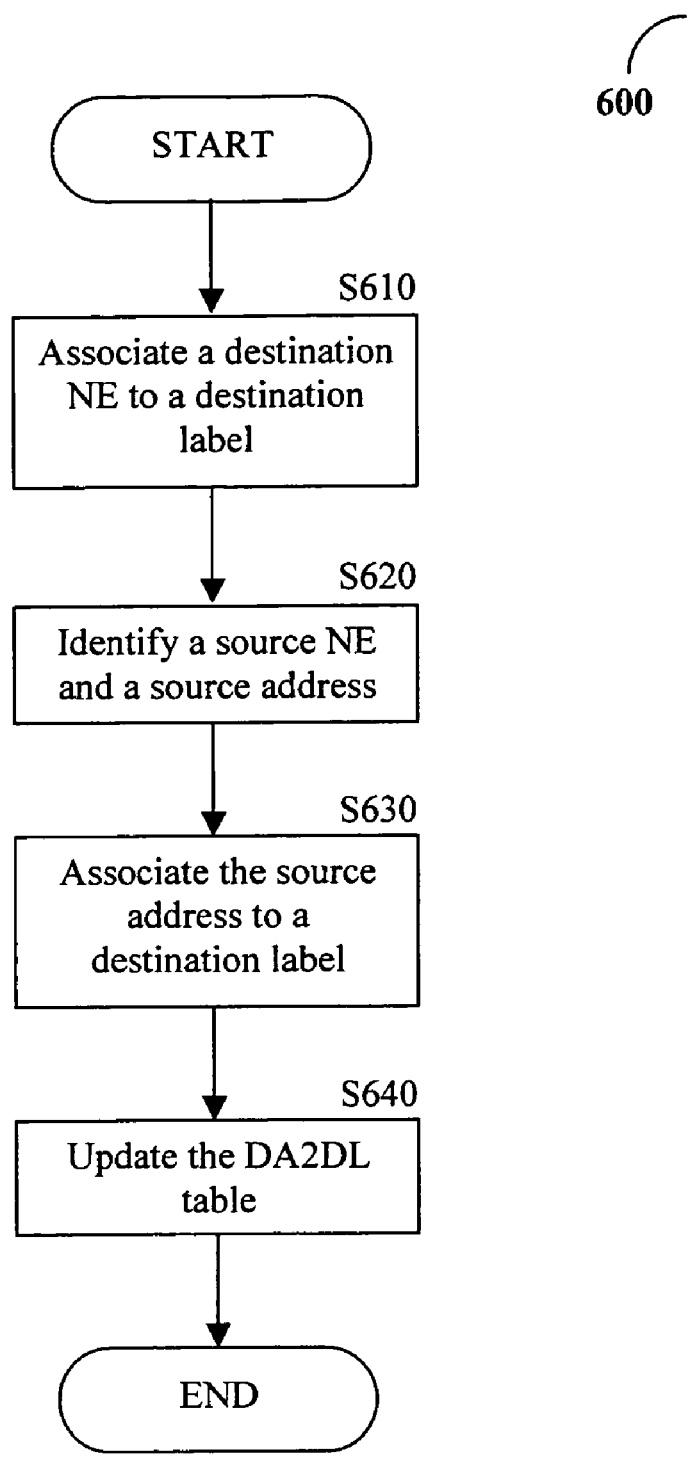
FIG. 6 is a non-limiting flowchart describing the destination address (DA) learning procedure in accordance with the present invention

FIG. 6 shows a non-limiting flowchart 600 describing the operation of the learning procedure in accordance with this invention. The learning procedure associates point-to-point connections with destination addresses and dynamically updates the content of the DA2DL table. In step S610, for each NE, a point-to-point connection is associated with a destination NE by means of a NMS or signaling. The relations between destination NEs and point-to-point connections are saved in the DNE2DL table. In step S620, a "learning" NE that receives a packet on a point-to-multipoint connection identifies the source address (SA) and the source NE of the incoming packet. The source NE is identified by the point-to-multipoint connection on which the packet is transmitted. That is, a packet sent over a point-to-multipoint connection includes a default label, and this label allows to identify the source NE. For example, the packet transmitted over point-to-multipoint connection 431 is associated with default label '991'. Hence, a "learning" NE that receives a packet with the label '991' concludes that the source NE is 420-1. In step S630, this SA is associated with a point-to-point connection directing to the source NE. This is performed by searching the DNE2DL table for a destination label related to the default label of point-to-point connection originating in the source NE. In step S640, the SA and the destination label found in the DNE2DL table are saved in the DA2DL table of the learning NE. Specifically, the SA is saved in DA2DL table 350 (FIG. 3) as a destination address and the source NE is saved as the destination NE.

As an example, FIG. 7A shows a DNE2DL 354 table configured by a NMS for NE 420-1. A packet sent from source NE 420-3 over a point-to-multipoint connection includes a source address of 'yyy' and a default label '993' identifying source NE 420-3. Once this packet is received at NE 420-1, the default label and the source address are identified. Next, the label associated with source NE 420-3, i.e., '993' is searched in DNE2DL table 354. This label is associated with a destination label '13' which relates to a point-to-point connection directing from NE 420-1 to NE 420-3. Once the source NE is associated with a destination label, the source address 'yyy' is linked up with label '13'. This relation is saved in a DA2DL table 350. FIG. 7B shows the content of DA2DL table 350 of NE 420-1. DA2DL table 750 includes a list of DAs, each DA relating to a destination label. A destination label determines the connection on which the packets are to be transmitted. For instance, a packet having a DA of 'xyz' is associated with a destination label '12' and will be transmitted over point-to-point connection 441-2; a packet having a DA of 'yyy' is associated with a destination label '13' and will be transmitted over point-to-point connection 441-3; a packet having a DA of 'zzz' is associated with a destination label '14' and will be transmitted over point-to-point connection 441-4; and a packet without a DA or with an unknown DA is associated with a default label '991' and will be transmitted over point-to-multipoint connection 431.

The present invention can further configure a point-to-point connection to transfer at an optimized bandwidth. For optimization purposes, the bandwidth to be allocated is calculated only once for point-to-point connections, while the point-to-multipoint connections utilize the same allocated bandwidth in the case in which the topology overlaps. The actual point-to-point connection bandwidth is determined by the service level defined for the VPLS.

Figure 8:
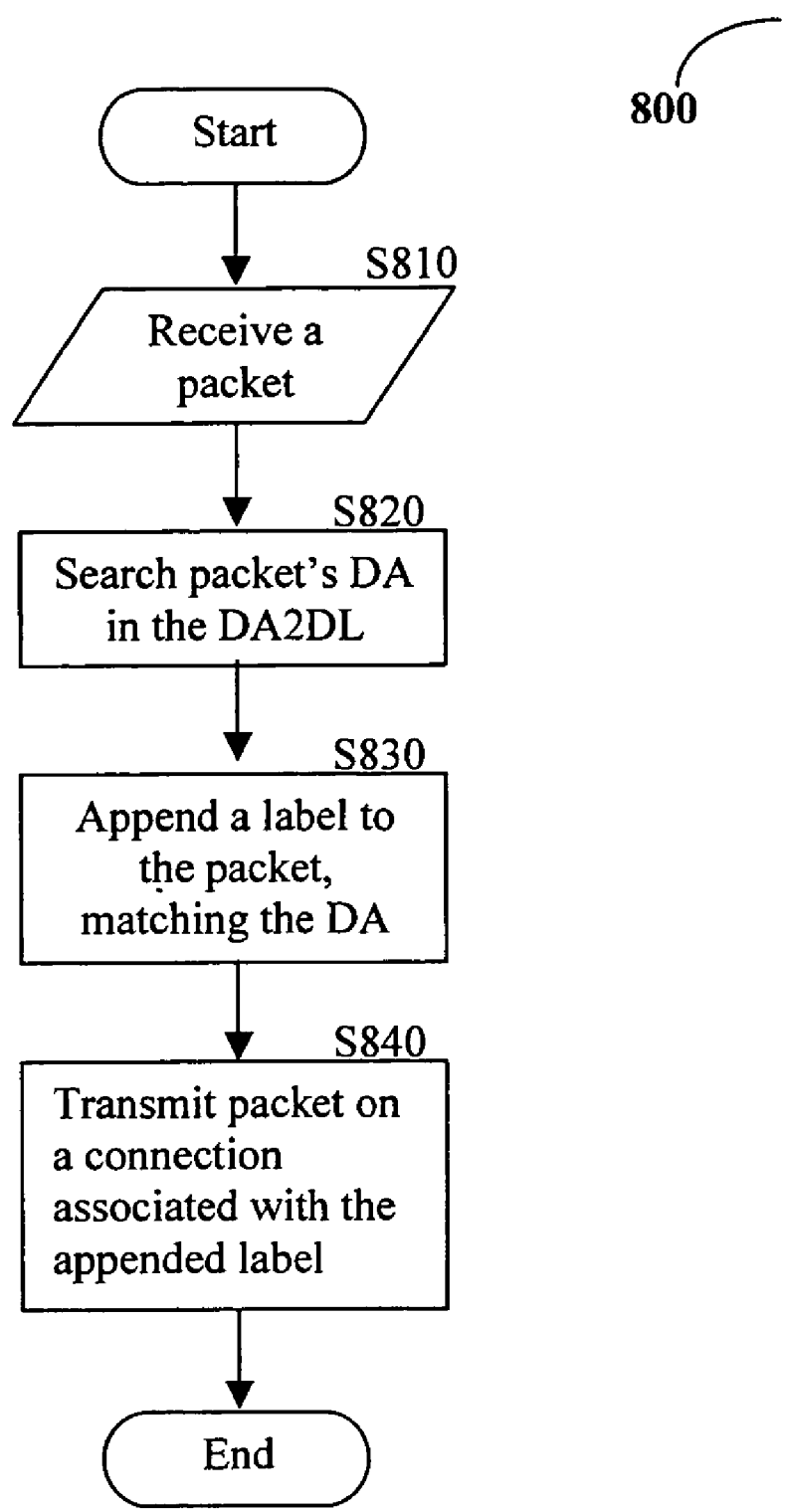
FIG. 8 is a non-limiting flowchart describing the operation of a VPLS in accordance with the present invention

Reference is now made to FIG. 8, which shows a non-limiting flowchart 800 describing the operation of multipoint network services established over a ring network topology according to the present invention. The method is described with reference to the VPLS as an exemplary case. This should not be viewed as limiting the scope of the invention. The VPLS is established using the process described in greater detail with reference to FIG. 4.

In step S810, a packet sent from a customer site is received at a source NE (e.g. NE 420-1). In step S820, the source NE searches its DA2DL table 350 to detect the destination label associated with the DA designated in the incoming packet. In step S830, the destination label found in step S820 is appended to the incoming packet. If the DA is not found in the DA2DL table 350, then a label of a point-to-multipoint connection is appended to the incoming packet. The label may be selected from the group consisting of a multi-protocol label switching (MPLS) label, an asynchronous transfer mode (ATM), a frame relay label, a time division multiplexing (TDM) time slot and a wavelength. In step S840, the packet is transmitted over a connection associated with the appended label. Each NE that receives this packet handles it according to a predetermined operation mode associated with the packet's destination label. For example, referring back to the VPLS network shown in FIG. 4, if a packet received at NE 420-1 has a DA of 'zzz', the destination label '14' is added to this packet, and thereafter the packet is transmitted over point-to-point connection 441-4. As discussed above, NE 420-2 is configured to forward to NE 420-3 packets received on connection 441-4, NE 420-3 is configured to forward to NE 420-4 packets received on the same connection 441-4, and NE 420-4 drops packets received on this connection. In another example, a packet received at NE 420-1 has a DA of 'mmm'. This address is not part of the exemplary DA2DL table 750 shown in FIG. 7B, so a default label '991' is associated with this packet, and thereafter the packet is transmitted over point-to-multipoint connection 430-1 to NE 420-2, NE 420-3, and NE 420-4. NE 420-2 replicates the incoming packet and forwards the packet replication to NE 420-3, while the original packet is sent to the customer site. The same is true for NE 420-3. Upon reception of the same packet over point-to-multipoint connection 430-1, NE 420-4 transfers the packet to the customer site. To eliminate loops, packets transmitted on a point-to-point or point-to-multipoint connections are discarded either by the source NE or using a time to live (TTL) mechanism.

Note that a flooded packet is replicated internally only once at the NE that performs that drop-and-forward function. Hence, packets replications are not performed at a source NE. This is opposed to prior art solutions, where a packet to be flooded is replicated at the source NE to as many as the number of NEs that are associated with a particular VPLS. Hence, using the present invention, packets to be flooded need only be transmitted from a specific NE once per its VCS interface. This significantly increases traffic efficiency and decreases network congestion, as fewer packets are transferred over the network.

The invention has now been described with reference to a specific embodiment where MPLS transport tunnels are used. Other embodiments will be apparent to those of ordinary skill in the art. For example, the method can be adapted for the use of other transport tunnels, such as generic route encapsulation (GRE), Layer two tunnel protocol (L2TP), Internet protocol security (IPSEC), and so on.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for enabling efficient bandwidth utilization of multipoint network services over a ring topology network that includes a plurality of network elements (NEs), comprising the steps of: a. setting up a full connectivity between the NEs of the ring topology network; and b. providing multipoint network services between said NEs using said full connectivity, wherein said step of setting up a full connectivity between all the NEs of the ring topology network further includes: i. establishing a first plurality of point-to-multipoint connections between each said source NE and all said edge NEs; and, ii. establishing second a plurality of point-to-point connections between each said source NE and every one of said edge NEs, and wherein said establishing of said first plurality of point-to-multipoint connections includes providing each said data packet with a respective default label, configuring each of said edge NEs except a terminal NE to perform a drop-and-forward operation on each said data packet having a default label and configuring said terminal NE to perform a drop action on each said data packet having a default label; whereby data packets of said multipoint network services flooded from one of said NEs that serves as a source NE to all other NEs of said plurality that serve as edge NEs, and whereby said data packets are not replicated at said source NE.

2. The method of claim 1, wherein said step of providing multipoint network services includes providing services selected from the group consisting of a virtual private LAN service (VPLS) and an emulated LAN service.

3. The method of claim a 1, wherein said establishing of a first plurality of point-to-multipoint connections includes establishing connections between each said source NE and at least two of said edge NEs, and wherein said establishing of a second plurality of point-to-point connections includes establishing a connection between said each source NE and at least one said edge NEs.

4. The method of claim 1, wherein said configuring is performed by an operator selected from the group consisting of a network management system (NMS), a command line interface (CLI), and a signaling protocol.

5. The method of claim 1, wherein said providing of each said data packet with a respective default label includes providing a default label associated with a respective said point-to-multipoint connection.

6. The method of claim 5. wherein said providing of each said data packet with a respective default label is performed by each said source NE.

7. The method of claim 6, wherein said providing of each said data packet with a respective default label by each said source NE includes appending said respective default label if at least one condition is satisfied, wherein said at least one condition is selected from the group of a condition in which a destination address not being designated in said packet, a condition in which a destination address is a multicast or broadcast address and a condition in which a point-to-point connection from said source NE to said edge NE does no exist.

8. The method of claim 7, wherein said designating each said data packet with a destination address includes designating each said data packet with an Ethernet medium access layer (MAC) address.

9. The method of claim 1, wherein said configuring each of said destination NEs except said terminal NE to perform a drop-and-forward operation on each said data packet having a default label further includes: A. replicating said data packet internally in said edge NE that receives said packet; B. sending a copy of said replicated data packet to at least one customer site connected to said edge NE; and, C. sending said data packet to a next NE connected to said ring topology network.

10. The method of claim 1, wherein said establishing of a second plurality of point-to-point connections between each said source NE and every one of said edge NEs includes associating each said point-to-point connection with a specific label.

11. A method for enabling efficient bandwidth utilization of multipoint network services over a ring topology network that includes a plurality of network elements (NEs), comprising the steps of: a. setting up a full connectivity between the NEs of the ring topology network: and b. providing multipoint network services between said NEs using said full connectivity; whereby data packets of said multipoint network services flooded from one of said NEs that serves as a source NE to all other NEs of said plurality that serve as edge NEs, and whereby said data packets are not replicated at said source NE, said step of setting up a full connectivity between all the NEs of the ring topology network further includes: i. establishing a first plurality of point-to-multipoint connections between each said source NE and all said edge NEs; and, ii. establishing second a plurality of point-to-point connections between each said source NE and every one of said edge NEs, wherein said establishing of a first plurality of point-to-multipoint connections includes establishing connections between each said source NE and each of said edge NEs, and wherein said establishing of a second plurality of point-to-point connections includes establishing a connection between said each source NE and every one of said edge Nes, and wherein said establishing of a second plurality of point-to-point connections between each said source NE and every one of said edge NEs further includes: A. configuring each NE positioned on a path between each said source NE and a respective edge NE to perform a forward action on each packet including said specific label; and, B. configuring said respective edge NE to perform a drop action on each packet including said specific label.

12. The method of claim 11, wherein said configuring is performed by an operator selected from the group consisting of a network management system (NMS), a command line interface (CLI), and a signaling protocol.

13. The method of claim 12, wherein said configuring each NE positioned on a path between each said source NE and a respective destination NE to perform a forward action on each packet including said specific label further includes sending said packet to a next NE on said ring topology network.

14. The method of claim 11, wherein said configuring of said respective edge NE to perform a drop action on each packet including said specific label further includes sending said packet to at least one customer site connected to said respective edge NE.

15. The method of claim 10, wherein said associating each said point-to-point connection with a specific label includes appending said specific label by said source NE based on a respective destination address of said packet.

16. The method of claim 15, wherein said specific label is selected from the group consisting of a multi-protocol label switching (MPLS) label, an asynchronous transfer mode (ATM), a frame relay label, a time division multiplexing (TDM) time slot and a wavelength.

17. The method of claim 1, wherein said data packets to be flooded comprise at least one of a multicast data packet, broadcast data packets and data packets with unknown destination address.

18. A network element (NE) operative to enable efficient bandwidth utilization of a multipoint network service over a ring topology network, comprising: a) a virtual connection selector (VCS) operative of map incoming data packets to connections; b) a plurality of input ports used for receiving said data packets from at least one customer site device c) a plurality of output ports for transferring said data packets to at least one customer site device; and, d) at least two ring ports to receive and transmit data packets over a communication means of the ring network; whereby the NE communicates with other NEs sharing the multipoint network service over a full connectivity established between the NEs of the ring topology network; and whereby data packets of the multipoint network service flooded from said NE to all said other NEs are not replicated by said NE, wherein said VCS includes: i. a destination address to a destination label (DA2DL) table used for mapping a destination address to a corresponding destination label associated with a said data packet; ii. a forward information table (FIT) coupled to said DA2DL table and used for associating a label with a specific forwarding function; and, iii. a destination NE-to-a destination label (DNE2DL) table coupled to said DA2DL and said FIT tables and used for mapping a destination NE to a corresponding destination label.

19. The NE of claim 18, wherein said connections include a first plurality of point-to-multipoint (P2MP) connections established to and from said NE over said ring topology network.

20. The NE of claim 18, wherein said connections further include a second plurality of point-to-point (P2P) connections established to and from said NE over said ring topology network.

21. The NE of claim 18, wherein said multipoint network service is selected from the group consisting of a virtual private local area network (LAN) service (VPLS) and an emulated local area network (LAN) service 22. The NE of claim 20, wherein said point-to-point connections and said point-to-multipoint connections are carried over connections based on a network selected from the group of a multi-protocol label switching (MPLS) network, an asynchronous transfer mode (ATM) network, and a Frame Relay network.

23. The NE of claim 18, wherein said destination addresses are included in said DA2DL table, and wherein each said destination address is associated with a corresponding destination label.

24. The NE of claim 23, wherein each said destination address includes an Ethernet medium access layer (MAC) address.

25. The NE of claim 18, wherein said specific forwarding function is selected from the group consisting of a drop function, a forward function and a drop-and-forward function.

26. The NE of claim 18, wherein said forwarding unit includes a forwarding information table (FIT) that indicates the forwarding actions to be performed per each said label

27. A system for efficient bandwidth utilization of a multipoint network service over a ring topology network, the system comprising: a. a plurality of network elements (NEs), each NE operative to provide a forwarding function; and b. a full connectivity mechanism that facilitates multipoint network services between all said NE on the ring topology network, wherein each said NE includes: i. a virtual connection selector (VCS) capable of mapping incoming data packets to network connections; ii. a plurality of input ports used for receiving said data packets from at least one customer site device; and, iii. a plurality of output ports for transferring said data packets to at least one customer site device, wherein said VCS further includes: a) a destination address to a destination label (DA2DL) table used for mapping a destination address to a corresponding destination label associated with a said data packet; b) a forward information table (FIT) coupled to said DA2DL table and used for associating a label with a specific forwarding function; and, c) a destination NE-to-a destination label (DNE2DL) table coupled to said DA2DL and said FIT tables and used for mapping a destination NE to a corresponding destination label.

* * * * *